Jan. 2, 1968  SHOJI NAGARE  3,361,339
ELECTRIC MOTOR AND COMPRESSOR ASSEMBLY
Filed Feb. 9, 1966  4 Sheets-Sheet 1

INVENTOR:
SHOJI NAGARE
BY Stephen H. Frishauf Atty

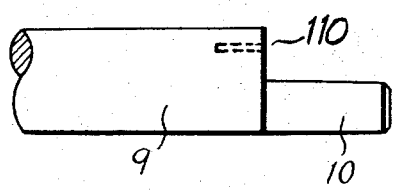
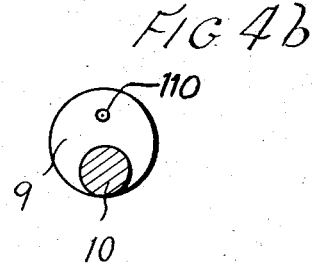
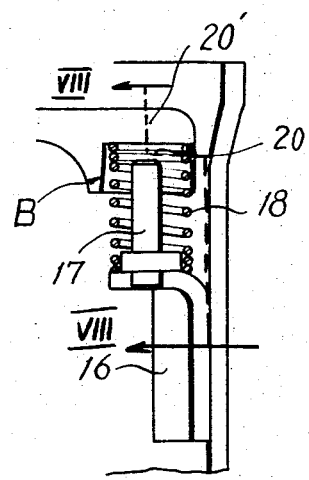
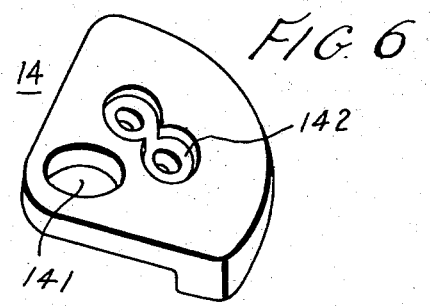
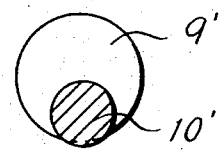
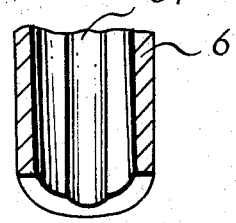

United States Patent Office 3,361,339
Patented Jan. 2, 1968

3,361,339
ELECTRIC MOTOR AND COMPRESSOR
ASSEMBLY
Shoji Nagare, Tokyo, Japan, assignor to Nippon Electric
Industry Company Limited, Tokyo, Japan, a corporation of Japan
Filed Feb. 9, 1966, Ser. No. 526,226
Claims priority, application Japan, Apr. 2, 1965,
40/18,884
3 Claims. (Cl. 230—58)

ABSTRACT OF THE DISCLOSURE

The motor-compressor assembly is supported in a housing by compression springs from below, said springs being arranged, at one end, in grooves of a support block for the assembly, and at the other end on supports connected to the housing.

---

The present invention relates to a hermetically sealable compressor and motor assembly, particularly for refrigerators, air conditioners and similar units.

Hermetically sealed compressor-motors for refrigerators are usually constructed in such a manner that a frame is made to which the compressor cylinder is secured. A motor, having a crank shaft, often combined with a counter balance, and counter weight for the crank shaft, is provided and secured to drive the compressor piston. With such separate assemblies it is difficult to accurately determine the rotor alignment, the balance of the shaft and of the entire assembly. Further, separate assembly operations are necessary, in addition to individual machining.

It is an object of the present invention to provide a unitary combination electric motor compressor assembly utilizing a minimum number of parts, permitting rapid and inexpensive assembly and balancing, and being readily suspended within a sealable housing without transmission of vibration thereto.

Briefly, in accordance with the present invention, a unitary compressor cylinder block and motor support is provided having motor support portion on one side and a cylinder support portion on the other. A bearing is formed substantially centrally of the block, and arranged in such a manner that the rotor of the electric motor can be inserted through the bearing so that the shaft of the motor projects on the other side thereof. The cylinder is arranged near the projecting end of the shaft; a piston, mounted on a conventional mechanism transmitting rotary to reciprocating motion can then be driven directly from the motor shaft. A counter weight, or a balancing disc can readily be affixed to the shaft close to the mounting point of the piston motion transmitting mechanism.

The structure, organization and operation of the invention will now be described more specifically in the following detailed description with reference to the accompanying drawings, in which.

Figure 3:
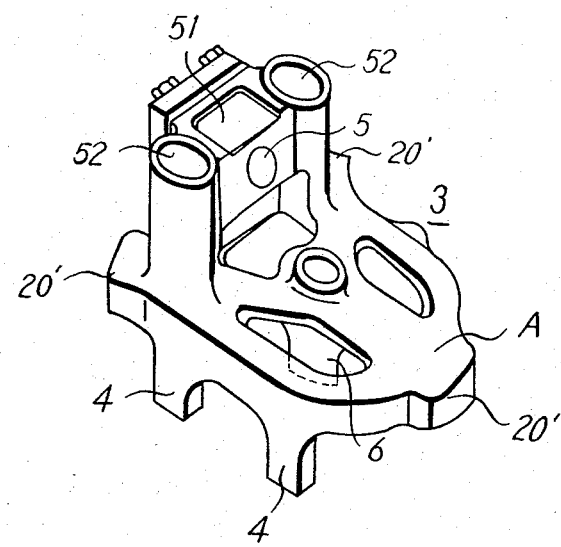
Figure 3:
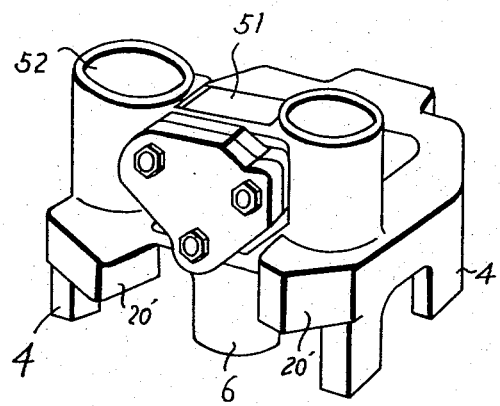
Figure 8:
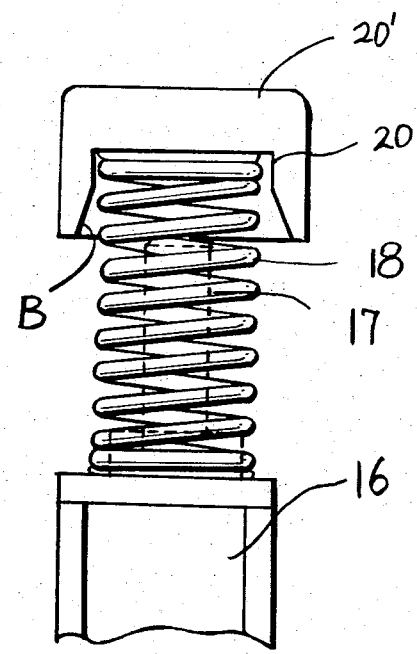

FIG. 3 (a) and (b) are perspective views of the cylinder block and motor support;

FIG. 4 (a) and (b) are side, and end views of the motor shaft;

FIG. 5 is a detailed view of the support of the motor-compressor assembly in the housing;

FIG. 6 is a perspective view of the balancing unit;

FIG. 7(a) is an end view of a different embodiment of motor shaft;

FIG. 7(b) is a partial sectional view of the bearing for a motor shaft according to FIG. 7 (a); and FIG. 8 is a detailed view of a spring support for the motor-compressor unit.

Figure 1:
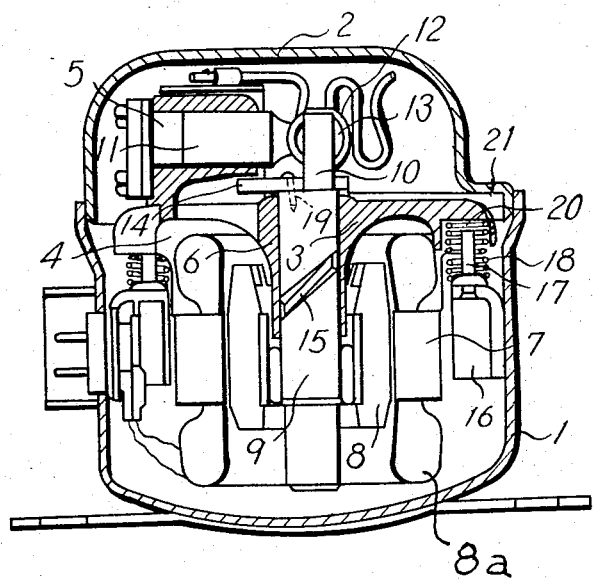
FIG. 1 is a longitudinal cross sectional view, partly pictorial, showing the structure of the hermetically sealed compressor motor according to the present invention.
Figure 2:
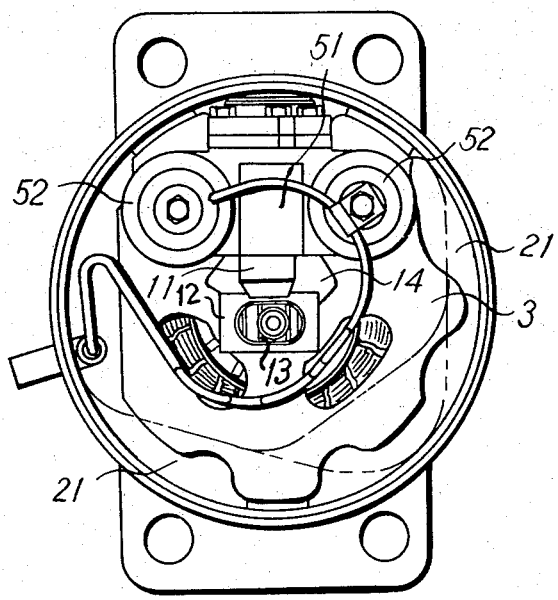
FIG. 2 is a plan view, with the top cover of the housing cut away.

Referring now to FIG. 1, the assembly is mounted within a housing, formed by a base unit 1 and a cover 2. A unitary compressor cylinder block and motor support 3, shown in detail in FIG. 3, is located within the housing, which can be hermetically sealed. The block 3, which preferably is a single casting, has a cylinder 5 formed therein, silencing chambers 52, and motor support brackets 4. Substantially centrally of the block 3 is a bearing 6, but best seen in FIG. 3 (b). Bearing 6 preferably has a dependent stub, and forms the sole bearing for the rotor as well as the motion transmitting elements of the motor-compressor unit. The motor itself is formed of a stator 7, having coils 8a surrounding a rotor 8. Rotor 8 is mounted on a shaft 9, which is preferably provided with a spiral oil groove 15 (shown in FIG. 1 only). Shaft 9 projects through the bearing 6 formed in the block 3 and extends to the other side of the block 3. A counter weight, or balancing unit 14, shown separately in FIG. 6, is secured to shaft 9. Shaft 9, at its end projecting beyond block 3, is formed with a plane surface from which an eccentric mounted pin 10 projects (see FIGS. 4 (a) and (b)). A piston 11 is located within cylinder 5, and loosely connected to a cross yoke 12, having an elongated opening in which eccentric mounted pin 10 fits, to transmit longitudinal reciprocating motion to piston 11 from the rotary motion of shaft 5, as is well known in the art. The arrangement is best seen in FIG. 2. The counter balance 14 is secured to the shaft by passing an opening 141 of the counter balance over pin 10, and securing the counter balance by means of a pin 19 (FIG. 1) through one of the holes 142 (FIG. 6) into a hole 110 (FIG. 4) of shaft 9. Providing a plurality of holes 142, or an elongated hole 142 permits adjustment of the counter weight.

The motor-compressor assembly is held in the housing formed of elements 1 and 2 by means of a plurality of springs which are received in spring sockets or guide holes 20, formed in projections 20' of the block 3, as best seen in FIGS. 3 and 8. Springs 18 are secured to the housing by fitting them over a thickened base of a guide pin 17, which in turn is held to the housing by a bracket 16, welded to housing unit 1. The inner portion of the spring socket 20 is preferably formed in such a manner that the terminal regions of the socket form an inclined, or a relieved surface, as seen at B (FIG. 5, FIG. 8), to permit some lateral excursion of the block without rubbing of the springs against the side of the housing. The guide pins 17 are of such length that the springs 18 can compress, under the weight of the motor and piston-cylinder assembly, but still provide some clearance. They are, however, slightly longer than the distance to the bottom of the housing, that is they are arranged to limit the vertical excursion of the suspended block under vibration during operation of the motor-compressor unit.

The top, or cover unit 2 of the housing is formed to have an internal flange, or shoulder 21 which is arranged so that it will fit partially over projections A, which may be co-extensive with the sockets 20', in order to limit the maximum upward excursion under vibration of the block.

The top of the cylinder unit 5 is formed with an inclined surface 51. After assembly, the entire unit may be supplied with sufficient oil which is brought up by the spiral oil groove 15 to the upper surface of the assembly. Oil is splashed upwardly, and some of it will drip down from the inclined surface 51 towards the cylinder hole 5, thus lubricating the reciprocating piston 11 within the cylinder. The motor shaft 9 and eccentric pin 10 are preferably shaped so that the eccentric pin 10 is within the outline of the cross sectional area of the shaft 9. If a greater travel of the piston 11 is desired, the eccentric pin 10 may project slightly beyond the outline 9' of the shaft, as shown in FIGS. 7 (a) and 10'. If this assembly is chosen, then the bearing 6 is provided with a longitudinal groove 61 (FIG. 7 (b)) which can receive the projecting portion of the eccentric pin 10'.

Forming the assembly with a unitary, cast compressor cylinder block support, permits simple and inexpensive assembly operations. First, the motor stator is assembled to blocks 4 of the block; then a sub-assembly consisting of the rotor and the shaft 9, with the eccentric pin 10 thereon, or integral with shaft 9, is pushed from the bottom through the bearing 6. Counter weight 14, and piston and motion transmission assembly 11, 12, 13 are placed in alignment as the shaft is pushed through. The counter weight is then secured to the shaft 9 by means of pin 19, which may be in the form of a set screw, with the shaft rotated in the position opposite to that shown in FIG. 1. If the modification according to FIG. 7 is used, the projection of the eccentric pin 10' is slid through the bearing 6 by alignment with groove 61. Groove 61 may also serve as an additional supply for lubricating oil.

Alignment and tests of the now completed unit can readily be undertaken; the unit can be placed on springs similar to springs 18 in an assembly fixture for testing, and balancing. Thereafter, springs 18 are mounted on pins 17, the electrical connections from the stator are made, the unit is lowered on the springs, and the springs are seated within sockets 20. Thereafter, refrigeration connections can be made (shown highly schematically in FIGS. 1 and 2, and not further identified since they are standard in the art), lubricant applied, cover 2 closed and sealed to cover 1.

In a preferred form, a number of springs 18 are provided, preferably 3, arranged symmetrically with respect to a plane passing through one of the springs and the shaft 9.

The present invention thus provides an easily assembled combination motor and compressor unit which is located within a housing formed of elements 1, 2; a unitary compressor cylinder block and motor support 3 is provided. One side of the motor support is provided with support brackets 4; a cylinder 5 is formed on the other side thereof, integral therewith. A central bearing 6, is provided to receive the rotor and its shaft 9; the shaft is provided with eccentric pin 10, over which a counter weight and balance 14 is secured, and which transmits motion to a compressor piston 11 by means of a yoke and slot 12, 13. The motor-compressor assembly is supported by springs 18 which are received in sockets 20 on the block 3, on the one hand, and secured to the housing on the other hand by means of a tight fit over pins 17, which are of such length that they limit the excursion of the block 3 under compression of the spring.

The block 3 is preferably a single casting. Upward excursion, under vibration conditions, of the block 3, can be limited by forming the housing, and preferably the upper housing portion 2 with a shoulder 21 (FIG. 1).

For ease of assembly the eccentric pin 10 should be within the outline of the cross sectional area of the shaft 9, or project only slightly beyond this outline; if the projecting form is used, then the bearing 6 has to be provided with a groove 61 to accommodate a projection during assembly. The top of the cylinder 5 is preferably formed with a downwardly inclined surface so that oils splashed on the top of the cylinder will drift towards the cylinder opening to provide lubrication for the piston 11.

The unitary assembly described above may also find application in other structures than compressor-motor assemblies for refrigeration or air conditioning use.

I claim:
1. A combination electric motor and compressor assembly comprising a housing having a lower support portion and an upper cover portion: a unitary compressor cylinder block and motor support having a motor support portion at the lower side thereof when located in the housing and a cylinder portion integral therewith at the upper side thereof, the block being formed at the lower motor support portion with spring receiving recesses; bearing means formed substantially centrally of said motor support portion to receive the rotor and shaft of said motor, a piston driven by the shaft and movable in said cylinder; a plurality of elongated compression springs for upholding said unitary block and motor support within said housing, said springs, being located and retained when the assembly is housed in position in said housing, at their upper ends each in the recesses of said unitary block, and a support means for the lower ends of said springs connected to said lower support portion of said housing and retaining said springs thereon, whereby the combination of motor, motor block and compressor, as a unit, is resiliently supported from below, within said housing permitting lateral and vertical clearance, to permit vibration of said motor block and support due to motor and compressor operation.

2. An assembly as claimed in claim 1, wherein said support means for the lower ends of said springs comprises pins mounted on brackets secured to said lower housing portion, said brackets projecting towards said unitary block to limit excursion of said block, under vibration towards said brackets.

3. Assembly as claimed in claim 2, wherein said housing is formed with an internal shoulder in registration with end portions of said block opposite said brackets to limit excursion of said block, under vibration, in a direction away from said brackets.

References Cited
UNITED STATES PATENTS

| 2,178,811 | 11/1939 | Sateren | 230—58 X |
| 2,435,108 | 1/1948 | Touborg | 230—58 |
| 2,959,068 | 11/1960 | Doeg | 230—58 X |
| 3,044,688 | 7/1962 | Frank et al. | 230—232 |
| 3,089,639 | 5/1963 | Hannibal | 230—235 |
| 3,154,244 | 10/1964 | Touborg | 230—58 X |

ROBERT M. WALKER, *Primary Examiner.*